Nov. 5, 1929.                H. L. KNEEN                1,734,384
                              TIRE SUPPORT
                           Filed Sept. 1, 1927

INVENTOR
Herbert L. Kneen
BY
ATTORNEY

Patented Nov. 5, 1929

1,734,384

UNITED STATES PATENT OFFICE

HERBERT L. KNEEN, OF WHITNEYVILLE, CONNECTICUT

TIRE SUPPORT

Application filed September 1, 1927. Serial No. 216,866.

This invention relates to a tire support for a rubber tire associated with a tractor wheel or the like.

It is the object of my invention, among other things, to provide mechanism of this character that may be economically constructed and readily assembled with a tractor wheel and separated therefrom with the minimum labor and skill.

The details and arrangement of the parts of my improved mechanism will be apparent from an inspection of the accompanying drawings in connection with the description hereinafter contained, and wherein a preferred embodiment of the invention is disclosed for the purpose of imparting an understanding thereof.

In the drawings, wherein like numerals of reference indicate like parts in the several figures.

Figure 1:
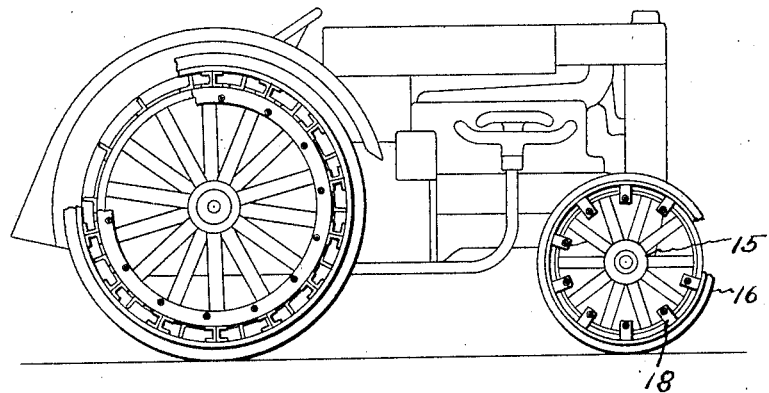
Figure 1 is a side elevation of a tractor having my improved tire support connected therewith.
Figure 2:
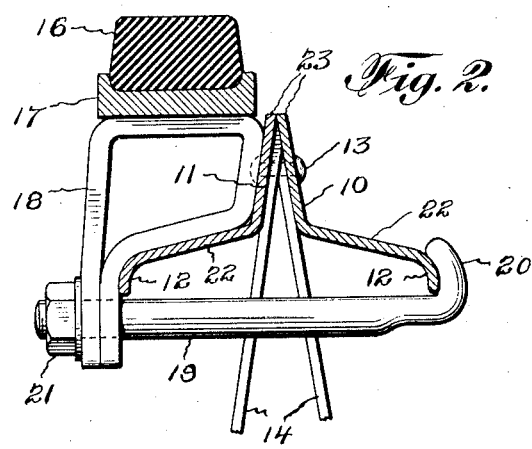
Figure 2 is an enlarged transverse sectional elevation of the rim of a tractor wheel, taken generally upon line 2—2 of Figure 3, with my improved mechanism associated therewith.

The tractor wheel, as shown herein is of a common well known type, constructed of two sections 10 and 11, each of which has flaring rim portions 22 that terminate at their inner ends in flanges 12, being secured together by rivets 13 or the like, which also secure the spokes 14 thereto, these being fixed at their inner ends to the wheel hub 15. Each of these sections is constructed with a portion 23 that projects outwardly and tapers slightly away from the outer edge.

Figure 3:
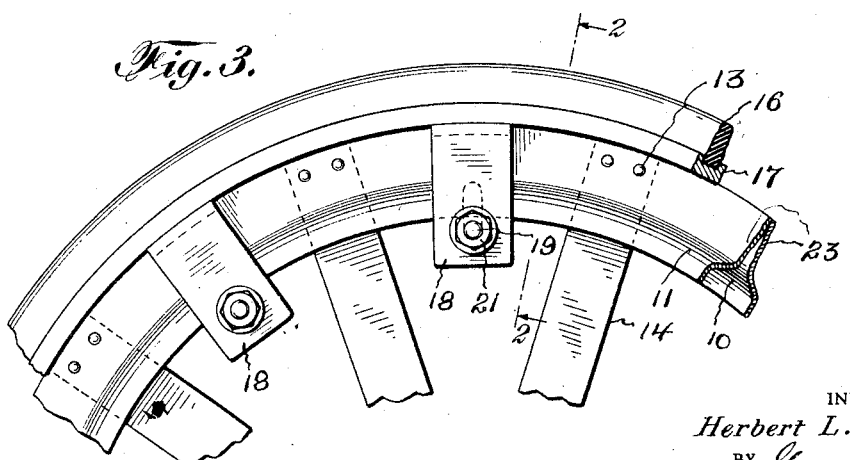
Figure 3 is a side elevation of a portion of a tractor wheel and my improved tire support associated therewith.

The rubber tire 16, held within the tire rim 17, has a greater outside diameter than the tractor wheel. This tire rim is separately secured to the wheel by means of a plurality of brackets 18, which are fixed to the tire rim by brazing, rivets or in any other convenient manner. These brackets preferably are shaped so as to conform to the outer faces of the wheel sections and fit snugly thereagainst. Through the double ends of each of these brackets is a bolt 19 having a head 20 thereon, which projects over the flange 12 on the section 10 and a nut 21. When assembled, the bolts 19 are turned so that each of the heads 20 projects over the flange 12 and tightening the nut draws the parts together, thus rigidly securing the brackets and associated parts to the wheel. The brackets are preferably arranged so that there is one between each pair of the spokes, substantially as shown in Figure 3, but a greater or less number may be provided if desired.

Within the scope of the appended claims, changes and alterations may be made within my invention, aside from those herein suggested.

What I claim as new, is:—

1. In combination with a wheel having a rim of substantially Y-shape in cross-section, a plurality of brackets each formed of a piece of metal doubled upon itself and having the free ends thereof abutting and provided with registering apertures, the inner sides of each bracket being shaped to conformably seat against one side of said Y-shaped rim and having the apertures of its ends projecting beyond the inner edge of the rim, a bolt for each bracket extending through said registering apertures and across and adjacent to the inner edges of the rim and having a head on one end engaged with the opposite side of the rim, and a nut on its opposite end engaged with said free ends of the bracket for holding the latter against said first named side of the rim, and a tire carried by the brackets.

2. In combination with a wheel having a rim constructed with a flange at an angle to the wheel axis that is joined by an outwardly projecting flange portion; a plurality of brackets having complementary faces that engage and are seated on the flange and against the flange portion; means connected with each of the brackets inside of the flange and engaging the wheel for securing the brackets in a fixed position; a rim connected with the brackets; and a tire carried by the rim.

3. In combination with a wheel rim; a rim outside of and projecting over the wheel rim; a tire within the latter rim; means for separably securing the rim to the wheel rim, comprising a plurality of brackets connected with the rim that project inwardly beyond one side face of the wheel rim, with an intermediate portion engaging the outer face of the wheel rim; and a bolt, or the like, with a nut thereon for each bracket for securing the bracket to the wheel rim.

4. In combination with the rim of a wheel having an outwardly projecting portion and a flange portion between the side of the rim and the projecting portion, a rim outside of the wheel rim and opposite the flange portion, a tire in the latter rim; means for separably securing the rim to the wheel rim, comprising a plurality of brackets connected with the rim that project inwardly beyond one side face of the wheel rim, with an intermediate portion engaging the outer face of the wheel rim; and means inside of the wheel rim for securing said brackets to the wheel rim.

5. The combination with a wheel having a rim substantially Y-shape in cross section; a rim projecting over that portion of the wheel rim between one side face thereof and that portion having the largest diameter; a tire on the latter rim; a plurality of brackets connected with the latter rim having complementary faces that engage and are seated against that portion of the face of the wheel rim that is opposite the rim; and means connecting each of the brackets to the wheel rim.

In testimony whereof, I have hereunto affixed my signature.

HERBERT L. KNEEN.